(12) United States Patent
Ozawa

(10) Patent No.: US 11,184,431 B2
(45) Date of Patent: Nov. 23, 2021

(54) SYSTEM AND CONTROL METHOD

(71) Applicant: CANON KABUSHIKI KAISHA, Tokyo (JP)

(72) Inventor: Yutaro Ozawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/002,056

(22) Filed: Aug. 25, 2020

(65) Prior Publication Data
US 2021/0067583 A1 Mar. 4, 2021

(30) Foreign Application Priority Data
Aug. 30, 2019 (JP) .............................. JP2019-158664

(51) Int. Cl.
*H04L 29/08* (2006.01)
*G06F 16/23* (2019.01)
*G06F 8/65* (2018.01)
*H04L 29/12* (2006.01)

(52) U.S. Cl.
CPC ............ *H04L 67/1002* (2013.01); *G06F 8/65* (2013.01); *G06F 16/2379* (2019.01); *H04L 61/1511* (2013.01); *H04L 61/2007* (2013.01)

(58) Field of Classification Search
CPC .......... H04L 51/24; G06F 3/011; G06F 3/165; G10L 13/00; G10L 25/78; H04R 1/028
See application file for complete search history.

(56) References Cited

U.S. PATENT DOCUMENTS

| | | | | |
|---|---|---|---|---|
| 2003/0195919 A1* | 10/2003 | Watanuki | .............. | H04L 67/327 718/105 |
| 2006/0242300 A1* | 10/2006 | Yumoto | ............ | H04L 29/06027 709/226 |
| 2008/0280623 A1* | 11/2008 | Danne | ................. | H04L 65/1006 455/453 |
| 2013/0013668 A1* | 1/2013 | Kodaka | ............... | H04L 67/1004 709/203 |
| 2014/0101226 A1* | 4/2014 | Khandekar | ......... | H04L 67/1031 709/203 |
| 2016/0092197 A1* | 3/2016 | Kuchibhotla | ............. | G06F 8/71 717/170 |

FOREIGN PATENT DOCUMENTS

JP 2018-088114 A 6/2018

* cited by examiner

*Primary Examiner* — Christopher B Robinson
(74) *Attorney, Agent, or Firm* — Canon U.S.A., Inc. IP Division

(57) ABSTRACT

A system includes a first processing system in which a current version of an application operates, a second processing system in which a next version of the application operates, and a management server. The management server registers information for accessing the second processing system in a database of the system. The first processing system receives a request from an external apparatus via a load balancing device included in the first processing system and, transmits the received request to the second processing system by using the information for accessing the second processing system registered in the database if the received request is a request to be processed in the second processing system.

8 Claims, 18 Drawing Sheets

FIG.5

| IP ADDRESS 1 | 123.123.123.123 |
|---|---|
| IP ADDRESS 2 | 124.124.124.124 |

FIG.6

```
GET /autosettingserver/api/xxxxx          ~601

Host: xyz-service.example.com             ~602

{
   auth_type: TestMaster                  ~603
}
```

FIG.9

| IP ADDRESS 1 | 123.123.123.123 |
|---|---|
| IP ADDRESS 2 | 124.124.124.124 |
| IP ADDRESS ACQUISITION KEY | aaa-xxxx-yyyymmdd-hhmmss.lb.yyy.com |

FIG.12

| IP ADDRESS 1 | 123.123.123.123 |
|---|---|
| IP ADDRESS 2 | 124.124.124.124 |
| EXPIRATION DATE | 20190516-111111 |

FIG.15

| IP ADDRESS 1 | 123.123.123.123 |
|---|---|
| IP ADDRESS 2 | 124.124.124.124 |
| IP ADDRESS ACQUISITION KEY | aaa-xxxx-yyyymmdd-hhmmss.lb.yyy.com |
| IP ADDRESS ACQUISITION DATE AND TIME | 20190516-111111 |

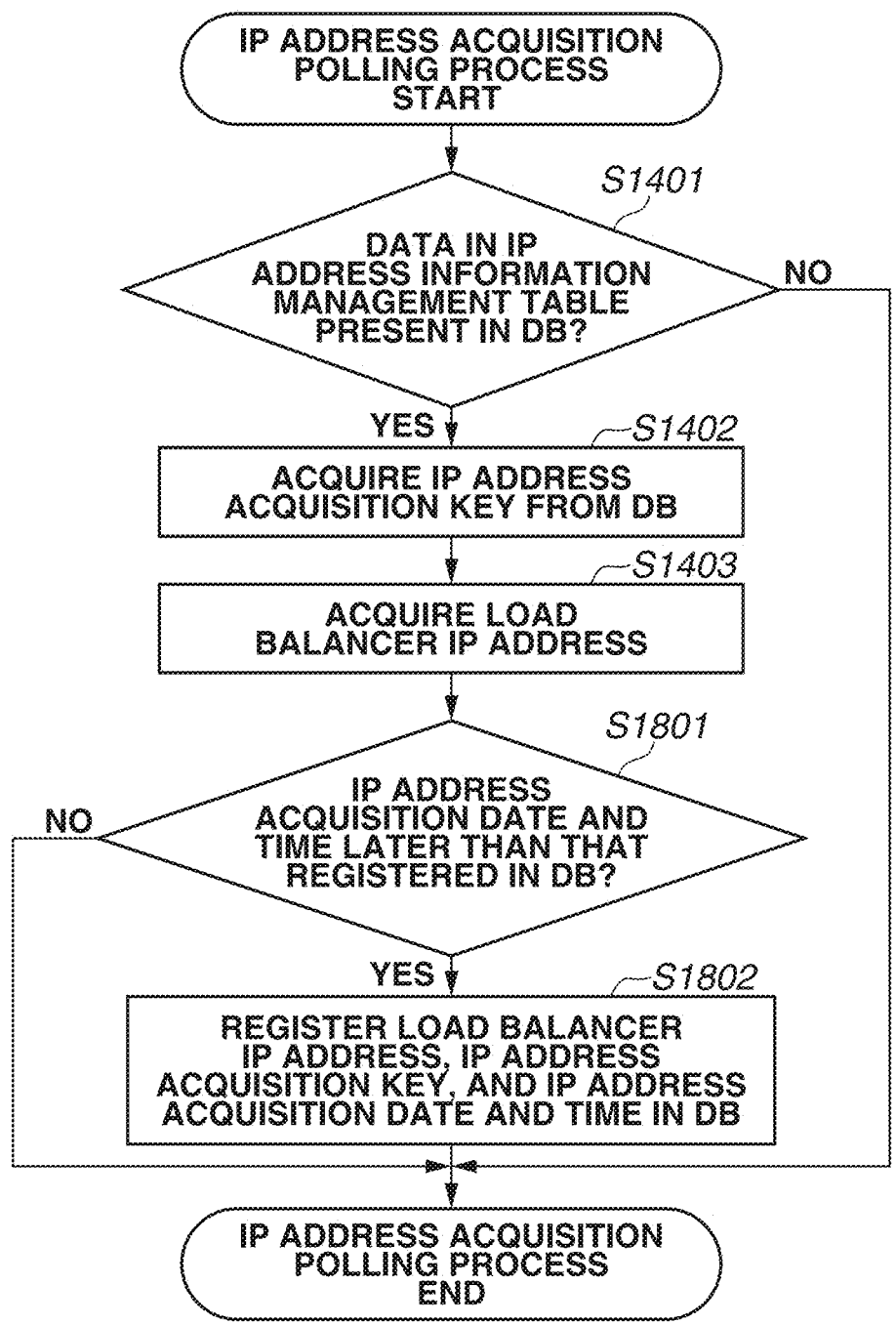

SYSTEM AND CONTROL METHOD

BACKGROUND

Field of the Disclosure

The present disclosure relates to a system including a first processing system in which a current version of an application operates, a second processing system in which a next version of the application operates, and a management server, and a control method.

Description of the Related Art

There is a cloud service in which a cloud vendor provides computing resources as Infrastructures as a Service (IaaS) or Platform as a Service (PaaS). Companies and organizations use the cloud service such as IaaS and PaaS to build a system for internal operations or for providing services to customers.

In addition, in a system using the cloud service, a method called Blue-Green deployment is used as a technique for updating the version of the system, as discussed in Japanese Patent Application Laid-Open No. 2018-088114. In this Blue-Green deployment, a Blue environment where a current version of an application works and a Green environment where a next version of the application works are constructed, and each of the environments (processing systems) includes a load balancer. A Domain Name System (DNS) record that a client refers to when accessing the system is changed from the internet protocol (IP) address of the load balancer included in the Blue environment to the IP address of the load balancer included in the Green environment. This allows the version to be upgraded without stopping the system.

Before updating the version using the Blue-Green deployment described above, it is common that an operation test including access check of the Green environment and simple function check is performed by an operation check client. In this case, since the operation test is performed before the DNS record is changed, it is necessary to directly specify the IP address of the load balancer so that the operation check client can access the Green environment. As a method to achieve this, there is a method of enabling the access by describing the load balancer IP address and domain of the Green environment in a hosts file (text file that describes the correspondence between an IP address and a domain name) installed as standard in a personal computer (PC). The hosts file is referenced before the DNS, and thus it is possible to access the Green environment by rewriting the hosts file of the operation check client PC.

When an external apparatus such as the operation check client transmits a request to be processed in the Green environment directly to the Green environment by using the hosts file in order to check the operation in a manner described above, there is such an issue as below.

In order for the operation check client to access the Green environment, rewriting the hosts file in the operation check client is required. Here, the hosts file is generally the monitoring target of security software of the PC. This is because the hosts file is targeted for tampering with pharming (which is a method of pretending to be accessing a correct uniform resource locator (URL) and guiding a user to another site by rewriting the IP address of a DNS server). Accordingly, in order to rewrite the hosts file in the operation check client, it is necessary to remove the hosts file from the monitoring target of the security software. Therefore, there is a concern that the security risk of the PC operating as the operation check client will increase.

Furthermore, an operator who performs an operation check needs to examine the information to be used for access to the Green environment. For example, it is necessary to find the IP address of the load balancer (load balancing device) in the Green environment. To do this, it is necessary to log in to a web user interface (UI) provided by a cloud vendor and find key information to acquire the IP address, which is troublesome for the operator who performs the operation check.

As described above, in a mechanism in which a request is directly transmitted to the Green environment from an external apparatus for the purpose of an operation check, there is a security risk and a load on the operator.

SUMMARY

According to an aspect of the present disclosure, a system includes a first processing system in which a current version of an application operates, a second processing system in which a next version of the application operates, and a management server. The management server includes one or more first memories, and one or more first processors that execute a set of first instructions to register information for accessing the second processing system in a database of the system. The first processing system includes one or more second memories, and one or more second processors that execute a set of second instructions to receive a request from an external apparatus via a load balancing device included in the first processing system and to transmit the received request to the second processing system by using the information for accessing the second processing system registered in the database if the received request is a request to be processed in the second processing system.

Further features of the present disclosure will become apparent from the following description of exemplary embodiments with reference to the attached drawings.

BRIEF DESCRIPTION OF THE DRAWINGS

FIG. 5 illustrates an example of an internet protocol (IP) address information management table.

FIG. 6 illustrates an example of a HyperText Transport Protocol (HTTP) request.

FIG. 9 illustrates an example of the IP address information management table.

FIG. 12 illustrates an example of IP address cache information.

FIG. 15 illustrates an example of the IP address information management table.

FIG. 18 is a flowchart illustrating an example of the IP address acquisition polling process.

DESCRIPTION OF THE EMBODIMENTS

Exemplary embodiments of the present disclosure will be described below with reference to the drawings.

Figure 1:
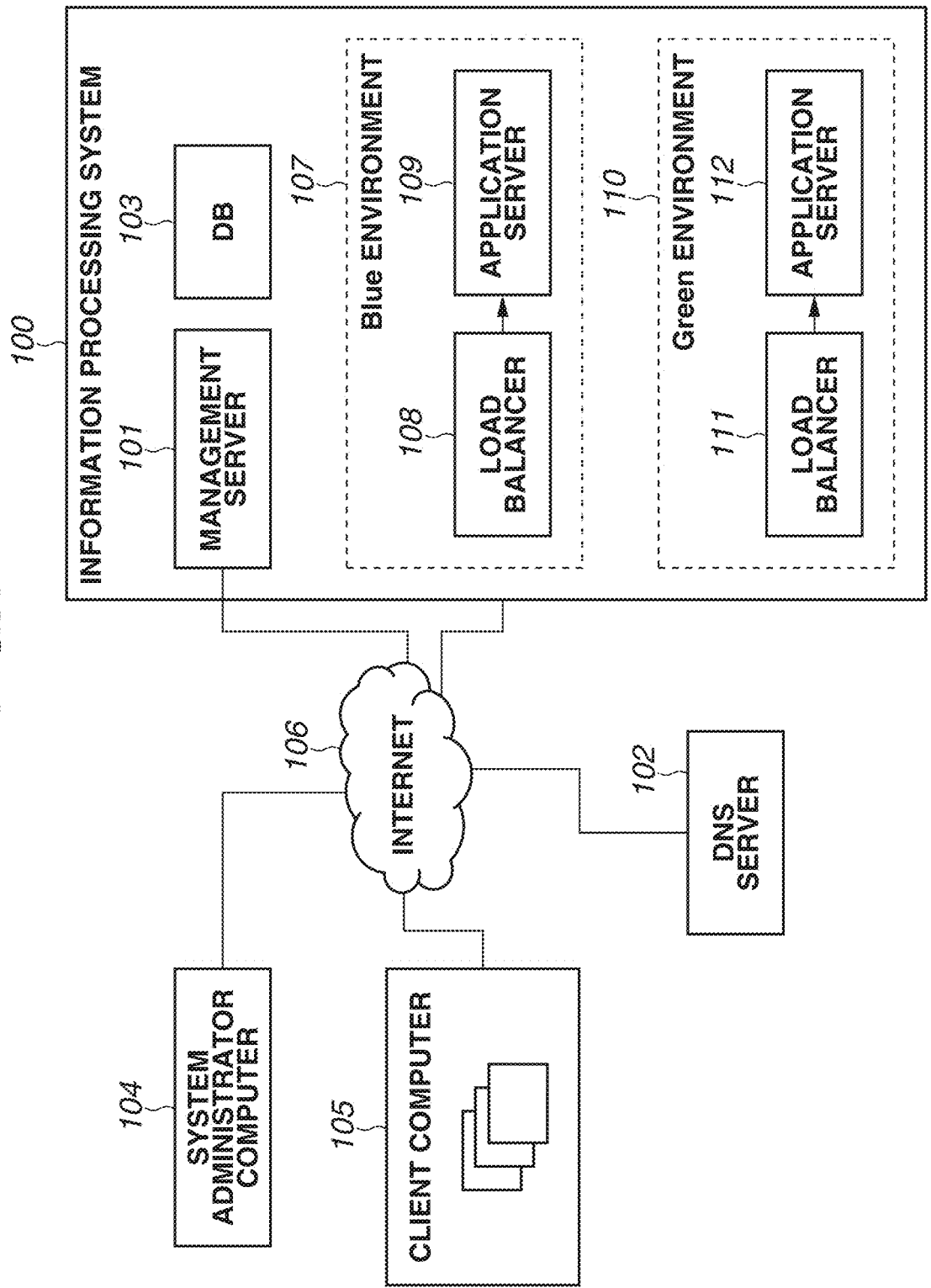
FIG. 1 is a block diagram illustrating a configuration of a network system according to an exemplary embodiment of the present disclosure.

A first exemplary embodiment will be described. FIG. 1 is a block diagram illustrating an example of a configuration of a network system according to an exemplary embodiment of the present disclosure. An information processing system 100 is a cloud service that provides a function of receiving a request from a client computer 105 and processing the request. The client computer 105 is assumed to be a user-operated personal computer (PC), an application server that provides a service to the user, or the like. The client computer 105 is connected to the information processing system 100 via an Internet 106. A system administrator computer 104 causes a management server 101 to execute various instructions from the system administrator for operating the information processing system 100. The system administrator computer 104 is connected to the management server 101 via the Internet 106.

The information processing system 100 includes the management server 101, a database (DB) 103, and a Blue environment 107 which is a processing system where a current version of an application operates. When performing a Blue-Green deployment, the information processing system 100 further includes a Green environment 110 which is a processing system where a next version of the application operates. The Blue environment 107 includes a load balancer 108 and an application server 109. The Green environment 110 includes a load balancer 111 and an application server 112. A Domain Name System (DNS) server 102 and the load balancers 108 and 111 are provided by a cloud vendor.

The DNS server 102 manages a DNS record that the client computer 105 refers to when accessing the information processing system 100, and a DNS record that represents each of the load balancers 108 and 111 provided by the cloud vendor. The DNS server 102 is connected to the Internet 106, and the client computer 105 accesses the DNS server 102 via the Internet 106. The DB 103 is a database that stores various data for providing services. In particular, in the present exemplary embodiment, information for accessing the Green environment 110 is registered in the DB 103. The information for accessing the Green environment 110 is, for example, the internet protocol (IP) address of the load balancer 111 included in the Green environment 110, but is not limited to this.

The load balancers 108 and 111 transfer a request from the client computer 105 to the application servers 109 and 112, respectively. The application server 109 is a virtual machine that processes the request received via the load balancer 108. The application server 112 is a virtual machine that processes the request received via the load balancer 111. Each of the application servers 109 and 112 may be activated by an auto scale function as a plurality of application servers. In the present exemplary embodiment, when receiving a request to be processed in the Green environment 110, the application server 109 transfers the request to the load balancer 111 in the Green environment 110.

In the present exemplary embodiment, a virtual machine is a logical computer implemented through virtualization technology (by dividing a server into logical units without restriction by the physical configuration and operating each of the logical units on an independent operating system). The application servers 109 and 112 are not limited to virtual machines, and an event-driven computing service using a serverless technology may process the request. Examples of the event-driven computing service include AWS Lambda, Google Cloud Functions, and Microsoft Azure Functions. The servers that constitute the event-driven computing service are provided as cloud computing services. In addition, the function of each hardware illustrated in FIG. 2 to be described below is implemented as application software by virtual machine software, and behaves in a similar way to a physical hardware element.

Figure 2:
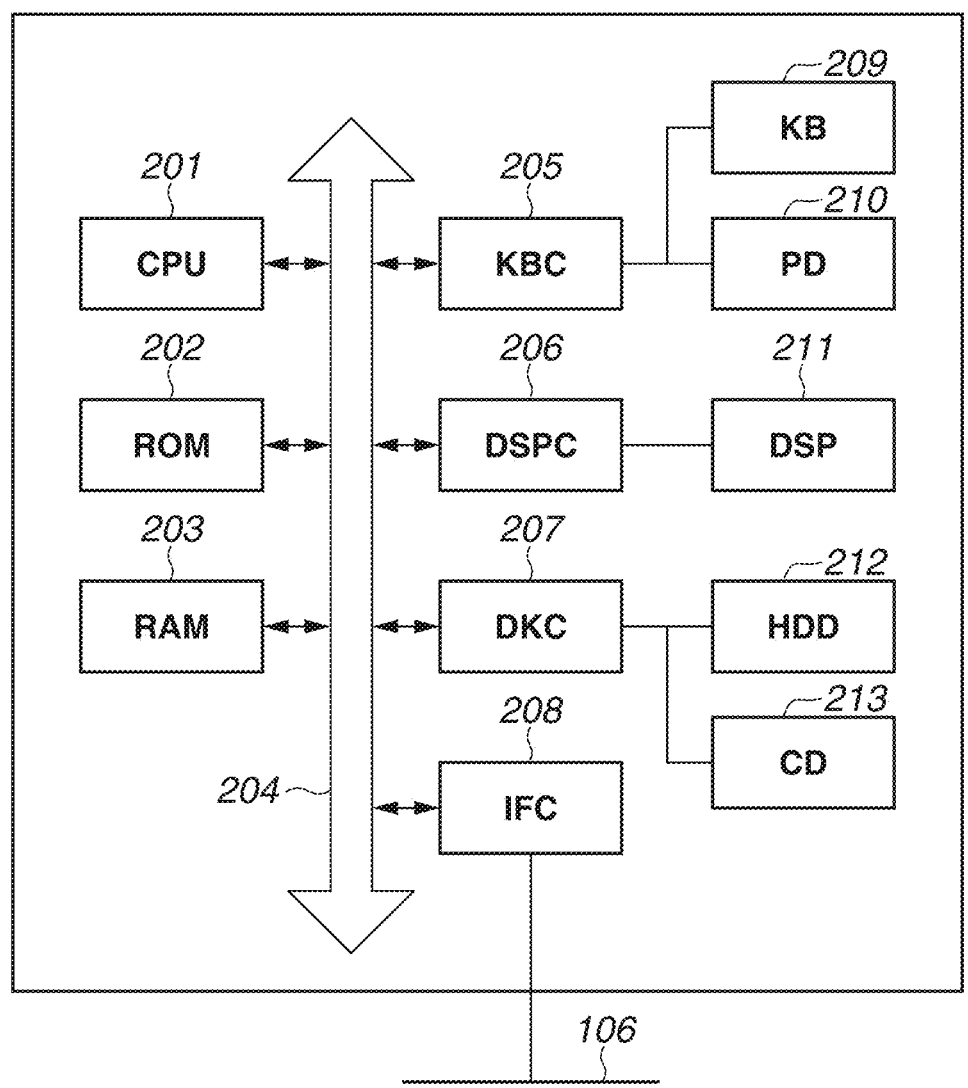
FIG. 2 is a block diagram illustrating a hardware configuration of a management server.

FIG. 2 is a block diagram illustrating an example of a hardware configuration of an information processing apparatus that functions as each of the management server 101, the application server 109, and the application server 112. In the management server 101, a hard disk (HDD) 212 stores a program of management server software. If the management server 101 and the application servers 109 and 112 are virtual machines, a server computer in which virtual machines functioning as the management server 101 and the application servers 109 and 112 operate is also included in the information processing apparatus.

A central processing unit (CPU) 201 performs the entire control of the management server 101. The CPU 201 reads out a device management program recorded in the HDD 212 to a random access memory (RAM) 203 and executes the device management program, and thus the software configuration of the management server 101 illustrated in FIG. 3 and the processes of flowcharts in FIG. 7, FIG. 10, FIG. 14, FIG. 16, and FIG. 18 (described below) are achieved.

A read only memory (ROM) 202 stores a Basic Input/Output System (BIOS) program and a boot program. The RAM 203 functions as the main memory of the CPU 201, the work area, and the like. A keyboard controller (KBC) 205 controls an instruction input from a keyboard (KB) 209, a pointing device (PD) 210, and other input devices. A display controller (DSPC) 206 controls the display on a display (DSP) 211.

A disk controller (DKC) 207 controls an access to a storage device such as the HDD 212 and a compact disc read-only memory (hereinafter referred to as CD) 213. The HDD 212, the CD 213, and the like store a boot program, an operating system program, a database, a management server software program, data, and the like. An interface controller (IFC) 208 performs data communication with the system administrator computer 104 via the Internet 106.

Each of these components is disposed on a system bus 204.

A program according to the present exemplary embodiment may be supplied in the form of being stored in a storage medium such as a CD. In that case, the program is read from the storage medium such as the CD 213 illustrated in FIG. 2, and installed in the HDD 212. The hardware configurations of the load balancers 108 and 111 and the application servers 109 and 112 are also as illustrated in FIG. 2. The function of each of the apparatuses is implemented by the CPU of each of the apparatuses executing a process based on a program stored in the HDD 212 of each of the apparatuses.

Figure 3:
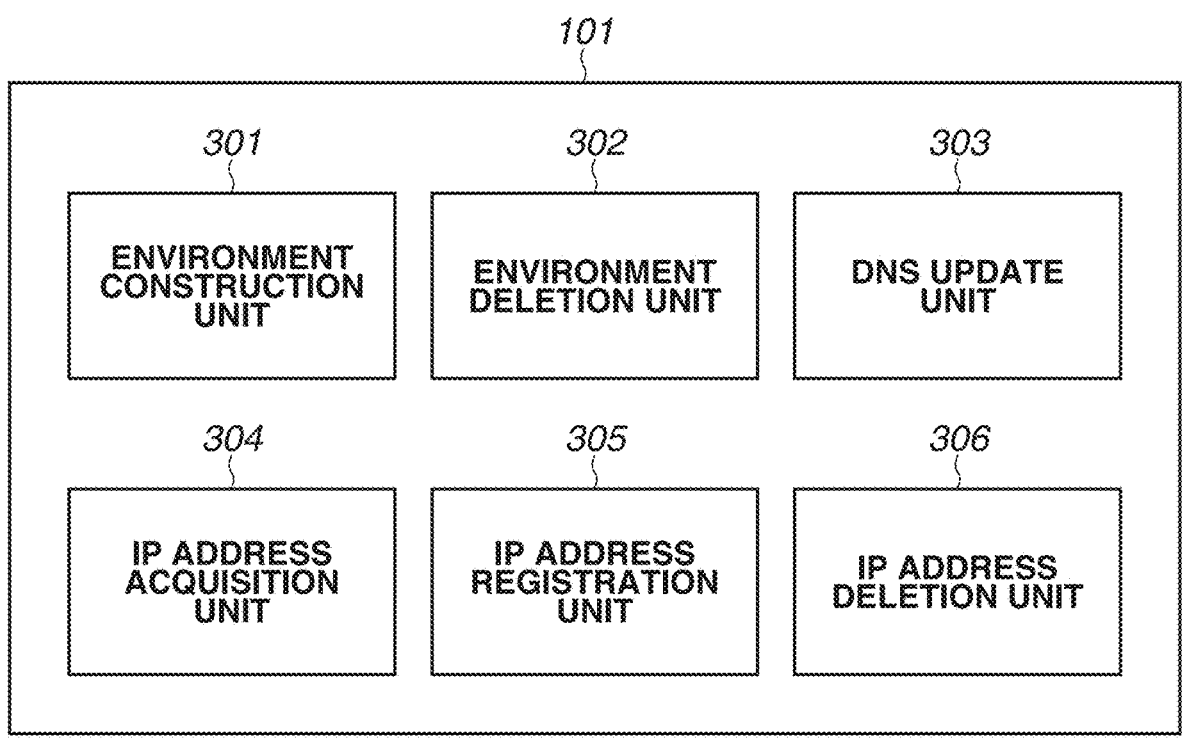
FIG. 3 is a block diagram illustrating a software configuration of the management server.

FIG. 3 is a black diagram illustrating an example of a software configuration of the management server 101. The management server 101 executes a process requested by the system administrator through the system administrator computer 104. The management server 101 includes an environment construction unit 301, an environment deletion unit 302, a DNS update unit 303, an IP address acquisition unit 304, an IP address registration unit 305, and an IP address deletion unit 306.

The environment construction unit 301 constructs the Green environment 110 which is the next version environment. At the time of construction, an application programming interface (API) provided by the cloud vendor is executed, thereby creating each component of the Green environment 110.

The environment deletion unit 302 deletes the Blue environment 107 which has become an old version environment by the Blue-Green deployment. At the time of deletion, the API provided by the cloud vendor is executed, thereby deleting each component of the Blue environment 107.

The DNS update unit 303 updates the DNS record managed by the DNS server 102. In the present exemplary embodiment, the record related to the processing system that operates as a production environment is rewritten by the DNS update unit 303, and the Blue-Green deployment is thereby performed. During operation check of the Green environment 110, the DNS server 102 does not manage the record related to the Green environment 110.

The IP address acquisition unit 304 acquires an IP address acquisition key of the load balancer 111 of the Green environment 110 constructed by the environment construction unit 301, and acquires the IP address of the load balancer 111 using the IP address acquisition key. The IP address acquisition key is acquired by using the API provided by the cloud vendor. The IP address is acquired by executing a command line tool with the IP address acquisition key as an argument. During operation check of the Green environment 110, since the DNS server 102 does not manage the record related to the Green environment 110, in the present exemplary embodiment, the IP address of the load balancer 111 of the Green environment 110 is managed by the DB 103.

The IP address registration unit 305 registers, in the DB 103, the IP address acquired by the IP address acquisition unit 304 and other additional information.

The IP address deletion unit 306 deletes the IP address registered in the DB 103 by the IP address registration unit 305. In the present exemplary embodiment, when the operation check of the Green environment 110 is completed, the IP address of the load balancer 111 of the Green environment 110 is deleted from the DB 103.

Figure 4:
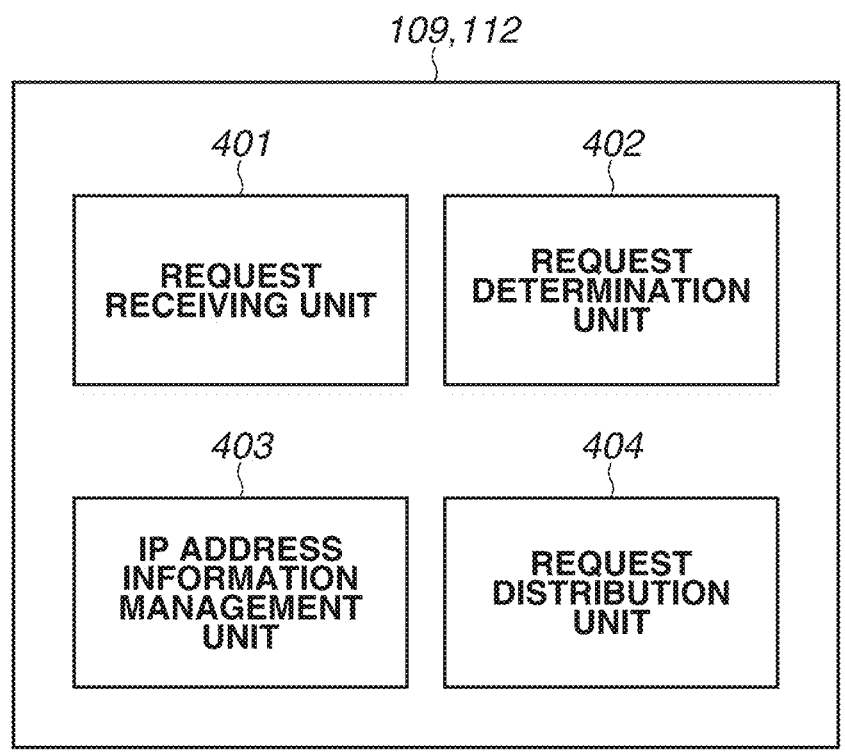
FIG. 4 is a block diagram illustrating an example of a software configuration of an application server.

FIG. 4 is a block diagram illustrating an example of a software configuration of each of the application servers 109 and 112. The application servers 109 and 112 process a request transferred from the load balancers 108 and 111, respectively. Each of the application servers 109 and 112 includes a request receiving unit 401, a request determination unit 402, an IP address information management unit 403, and a request distribution unit 404.

The request receiving unit 401 receives a request from each of the load balancers 108 and 111.

The request determination unit 402 determines, based on the content of the request received by the request receiving unit 401, whether the request is a request from a user (described below) having operation check authority. The determination method will be described below.

The IP address information management unit 403 acquires data in an IP address information management table (described below) registered on the DB 103 by the IP address registration unit 305, based on the determination result of the request determination unit 402.

The request distribution unit 404 distributes the request to the IP address acquired by the IP address information management unit 403.

FIG. 5 illustrates an example of the IP address information management table. The table is held in the DB 103. The IP address of the load balancer 111 registered by the IP address registration unit 305 is registered in the table. When the load balancer 111 has a plurality of IPs according to the specifications of the cloud vendor, all the IPs are registered in the table (in FIG. 5, two IP addresses are illustrated as an example). In this table, the IP address of the load balancer 111 in the Green environment 110 is managed as information for accessing the Green environment 110 whose operation is being checked.

FIG. 6 illustrates an example of a configuration of a HyperText Transport Protocol (HTTP) request transmitted from the client computer 105 to the load balancer 108 by an operation of the user having the operation check authority. Information 601 represents an HTTP method and a request uniform resource locator (URL). Information 602 represents an HTTP header. Information 603 represents the body of the request, and the request source user's authority type is described in the body. In FIG. 6, "TestMaster" is set as a character string that represents the operation check authority. The request is transmitted to the application server 109 when passing the verification with an authentication server (not illustrated). The application server 109 checks the information 603 to verify whether the authority type is a character string representing the operation check authority.

Figure 7:
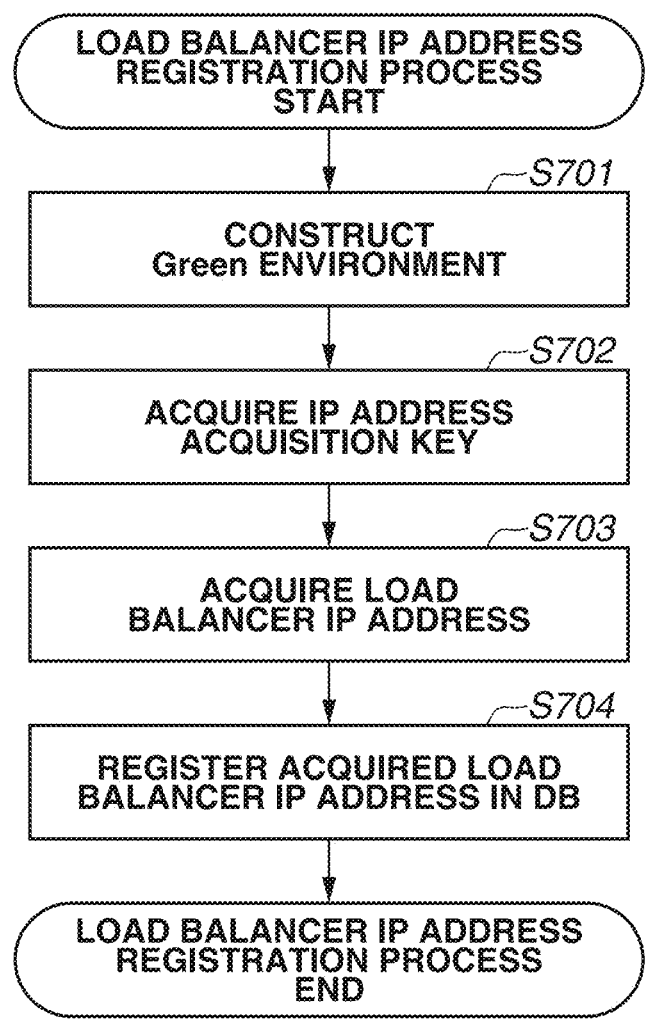
FIG. 7 is a flowchart illustrating an example of a load balancer IP address registration process.

FIG. 7 is a flowchart illustrating an example of a load balancer IP address registration process by the management server 101. The process illustrated in this flowchart is executed by the management server 101 to register, in the DB 103, the IP address of the load balancer 111 in the Green environment 110 that has been newly constructed. The process of the flowchart is implemented by the CPU 201 reading and executing the program recorded in the ROM 202, the RAM 203, the HDD 212 or the like.

In step S701, the environment construction unit 301 constructs the Green environment 110.

In step S702, the IP address acquisition unit 304 acquires the IP address acquisition key using the API provided by the cloud vendor.

In step S703, the IP address acquisition unit 304 executes the command line tool with the IP address acquisition key acquired in step S702 as an argument, and acquires the IP address of the load balancer 111.

In step S704, the IP address registration unit 305 registers the IP address of the load balancer 111 acquired in step S703 in the DB 103 as the IP address information management table.

Figure 8:
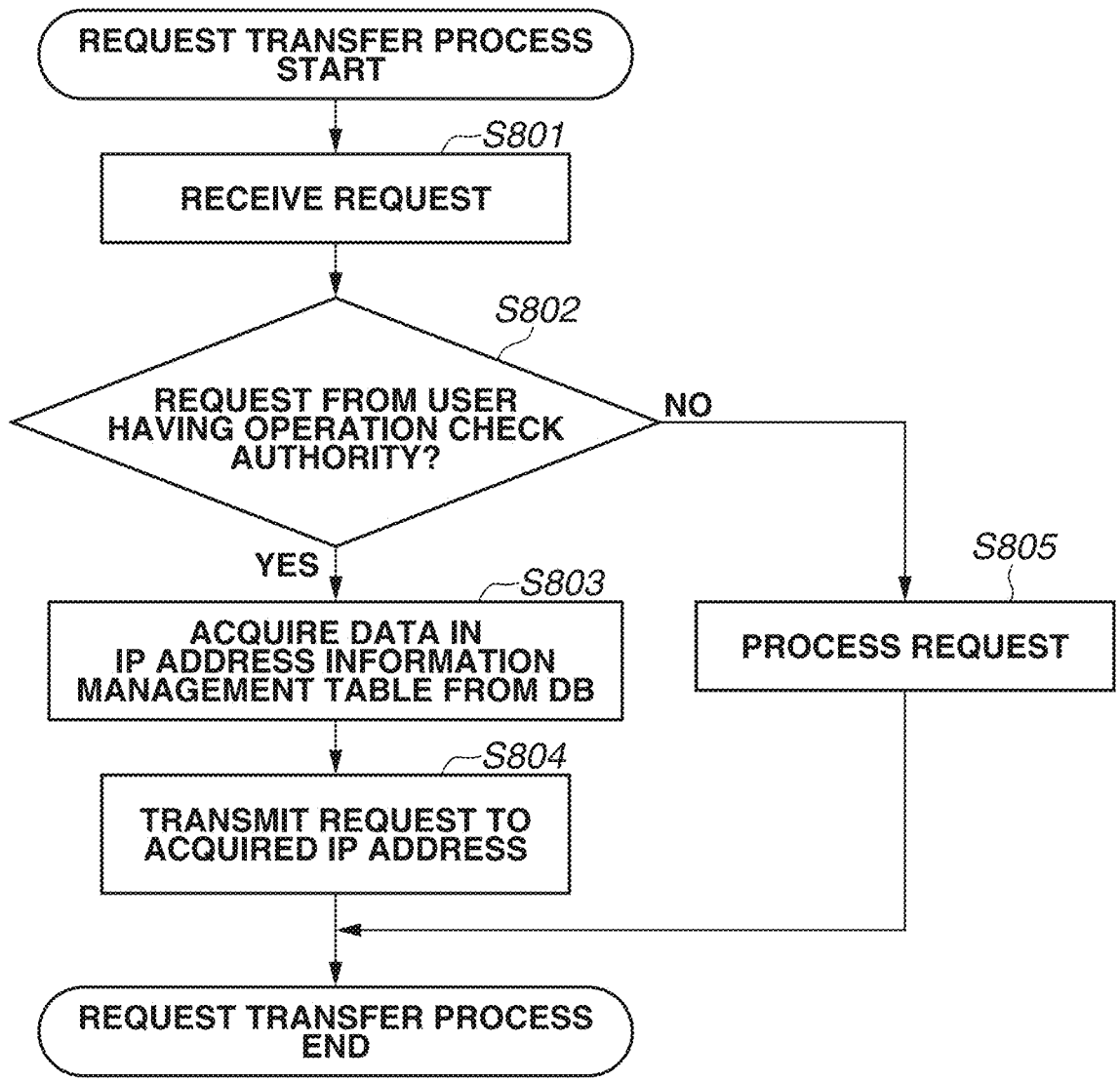
FIG. 8 is a flowchart illustrating an example of a request transfer process.

FIG. 8 is a flowchart illustrating an example of a request transfer process by the application server 109. The process illustrated in this flowchart is performed during the operation check after the Green environment 110 has been constructed. The process of the flowchart is implemented by the CPU 201 of the application server 109 reading and executing the program recorded in the ROM 202, the RAM 203, the HDD 212 or the like.

In step S801, the request receiving unit 401 receives a request from an external apparatus via the load balancer 108. The request has the configuration illustrated in FIG. 6.

In step S802, the request determination unit 402 verifies whether the authority type in the request body received in step S801 matches the character string representing the operation check authority. If the authority type in the request body matches the character string (YES in step S802), the processing proceeds to step S803. If the authority type in the request body does not match the character string (NO in step S802), the processing proceeds to step S805.

In step S803, the IP address information management unit 403 acquires data in the IP address information management table from the DB 103.

In step S804, the request distribution unit 404 transmits the request to the IP address acquired in step S803.

In step S805, a request from a user not having the operation check authority among the requests received in step S801 is processed.

In the present exemplary embodiment, it is determined that the request is a request to be processed in the Green environment 110, based on the fact that the request includes a predetermined identifier that represents the operation check authority. As another method, it may be determined that the request is a request to be processed in the Green environment 110, based on the processing type of the request.

Although not illustrated in the flowchart, the IP address deletion unit 306 deletes the IP address information management table on the DB 103 based on an operation from the system administrator computer 104 after the operation check work is completed. In addition, the DNS update unit 303 registers the IP address of the load balancer 111 in the DNS server 102 and switches from the Blue environment 107 to the Green environment 110. Then, the environment deletion unit 302 deletes the Blue environment 107 that has become an old Blue environment.

As described above, according to the first exemplary embodiment, the management server 101 acquires the IP address of the load balancer 111 and registers the IP address in the DB 103 when constructing the Green environment 110, and a request from an external apparatus is thereby transmitted to the Green environment 110 via the Blue environment 107 and processed. This eliminates the need to transmit the request to be processed in the Green environment 110 from the external apparatus directly to the Green environment 110, and therefore it is not necessary to find the IP address acquisition key and rewrite the hosts file on the PC of an operation checker. In other words, it is possible to access the Green environment 110 while reducing the workload of the operation checker and the security risk on the PC.

A second exemplary embodiment will be described. In the first exemplary embodiment, the application server 109 in the Blue environment 107 transmits a request to the load balancer 111 in the Green environment 110 by using the IP address of the load balancer 111 in the Green environment 110 registered in the DB 103. However, the IP address of the load balancer 111 in the Green environment 110 may be changed without notice. In such a case, the application server 109 in the Blue environment 107 fails to access the Green environment 110. Accordingly, in the present exemplary embodiment, if the access to the Green environment 110 fails, the application server 109 acquires and registers the changed IP address in the DB 103, and transmits the request to the Green environment 110 with the changed IP address.

The configurations illustrated in FIGS. 1 to 4 and 6 are common to both the first and second exemplary embodiments. Thus, in the second exemplary embodiment, the same parts as those in the first exemplary embodiment are denoted by the same reference numerals and the description thereof will be omitted. The differences from the first exemplary embodiment will be mainly explained below.

FIG. 9 illustrates an example of the IP address information management table registered in the DB 103 by the IP address registration unit 305 in step S704. The difference from FIG. 5 is that key information for IP address acquisition is also held. In the second exemplary embodiment, when the IP address is changed, the application server 109 re-acquires the IP address with this IP address acquisition key.

Figure 10:
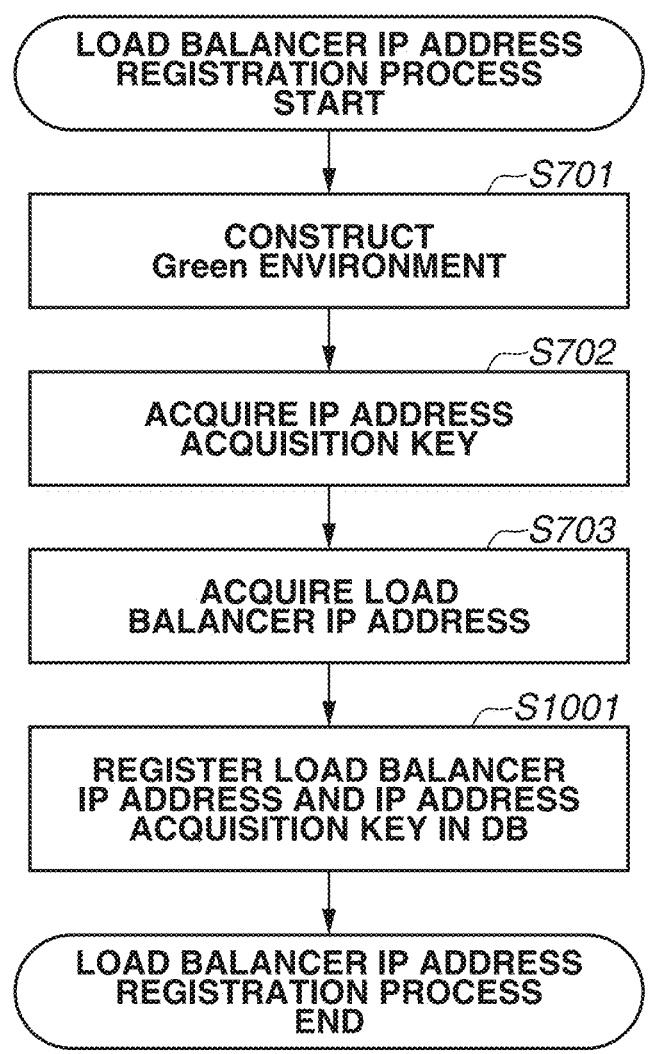
FIG. 10 is a flowchart illustrating an example of the load balancer IP address registration process.

FIG. 10 is a flowchart illustrating an example of the load balancer IP address registration process by the management server 101. The process illustrated in this flowchart is executed by the management server 101 to register, in the DB 103, the IP address of the load balancer 111 in the Green environment 110 that has been newly constructed. The process of the flowchart is implemented by the CPU 201 reading and executing the program recorded in the ROM 202, the RAM 203, the HDD 212 or the like.

Compared with FIG. 7, the difference is that step S704 is replaced with step S1001. With regard to the same processes as those in FIG. 7, the same reference numerals are used and the description thereof will be omitted.

In step S1001, the IP address registration unit 305 registers, in the DB 103, the IP address acquisition key acquired in step S702 and the IP address acquired in step S703 as the IP address information management table.

Figure 11:
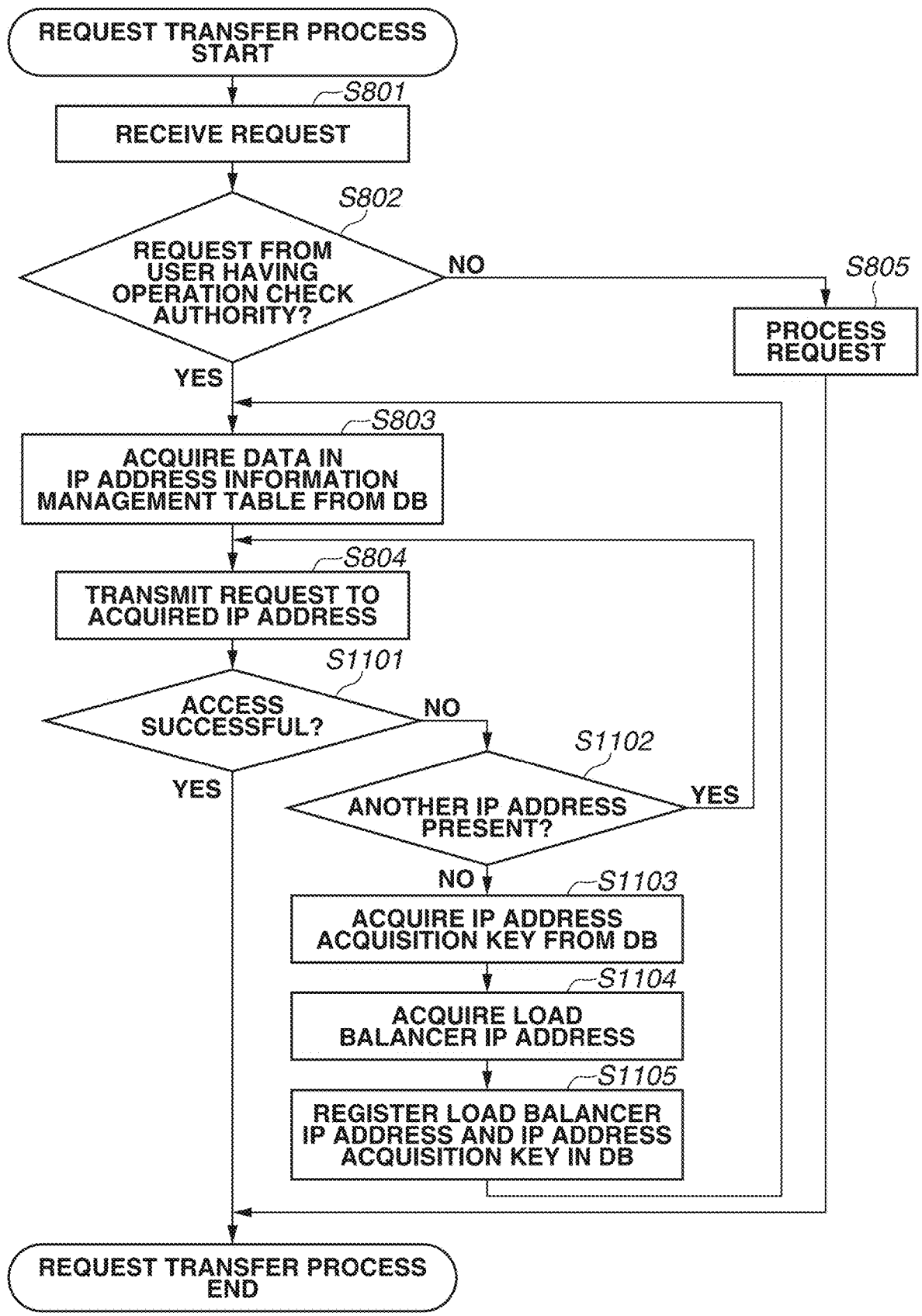
FIG. 11 is a flowchart illustrating an example of the request transfer process.

FIG. 11 is a flowchart illustrating an example of the request transfer process by the application server 109. The process illustrated in this flowchart is performed during the operation check after the Green environment 110 has been constructed. The process of the flowchart is implemented by the CPU 201 of the application server 109 reading and executing the program recorded in the ROM 202, the RAM 203, the HDD 212 or the like.

Compared with FIG. 8, the difference is that steps S1101 to S1105 are added. With regard to the same processes as those in FIG. 8, the same reference numerals are used and the description thereof will be omitted.

In step S1101, the request distribution unit 404 determines whether the request transmitted in step S804 fails. If the access is unsuccessful (NO in step S1101), the processing proceeds to step S1102. If the access is successful (YES in step S1101), the request transfer process ends.

In step S1102, the request distribution unit 404 determines whether another IP address is present in the data in the IP address information management table acquired in step S803. If another IP address is present (YES in step S1102), the processing proceeds to step S804. If another IP address is not present (NO in step S1102), the processing proceeds to step S1103.

In step S1103, the IP address information management unit 403 acquires the IP address acquisition key in the IP address information management table managed on the DB 103.

In step S1104, the IP address of the load balancer 111 is acquired using the IP address acquisition key acquired in step S1103.

In step S1105, the IP address acquisition key acquired in step S1103 and the IP address acquired in step S1104 are registered in the DB 103 as the IP address information management table.

Steps S1103 to S1105 are performed by the application server 109 in the present exemplary embodiment, but may be performed by the management server 101.

As described above, according to the second exemplary embodiment, if the IP address of the load balancer 111 in the Green environment 110 is changed and the access fails, the IP address is re-registered, and it is thereby possible to access the Green environment 110 without reducing the work efficiency of the operation checker.

A third exemplary embodiment will be described. In the first and second exemplary embodiments, the application server 109 acquires the IP address registered in the DB 103 each time receiving the request to be processed in the Green environment 110. On the other hand, in the third exemplary embodiment, the application server 109 holds the IP address acquired from the DB 103, along with an expiration date. The configurations illustrated in FIGS. 1 to 4, 6, 9, and 10 are common to both the second and third exemplary embodiments. Thus, in the third exemplary embodiment, the same parts as those in the second exemplary embodiment will be denoted by the same reference numerals and the description thereof will be omitted. The differences from the second exemplary embodiment will be mainly explained below.

FIG. 12 illustrates an example of IP address cache information held by the application server 109. The cache information is the IP address information in the IP address information management table acquired from the DB 103 by the IP address information management unit 403, with an expiration date added thereto. In FIG. 12, the expiration date is described in a yyyymmdd-hhmmss format.

Figure 13:
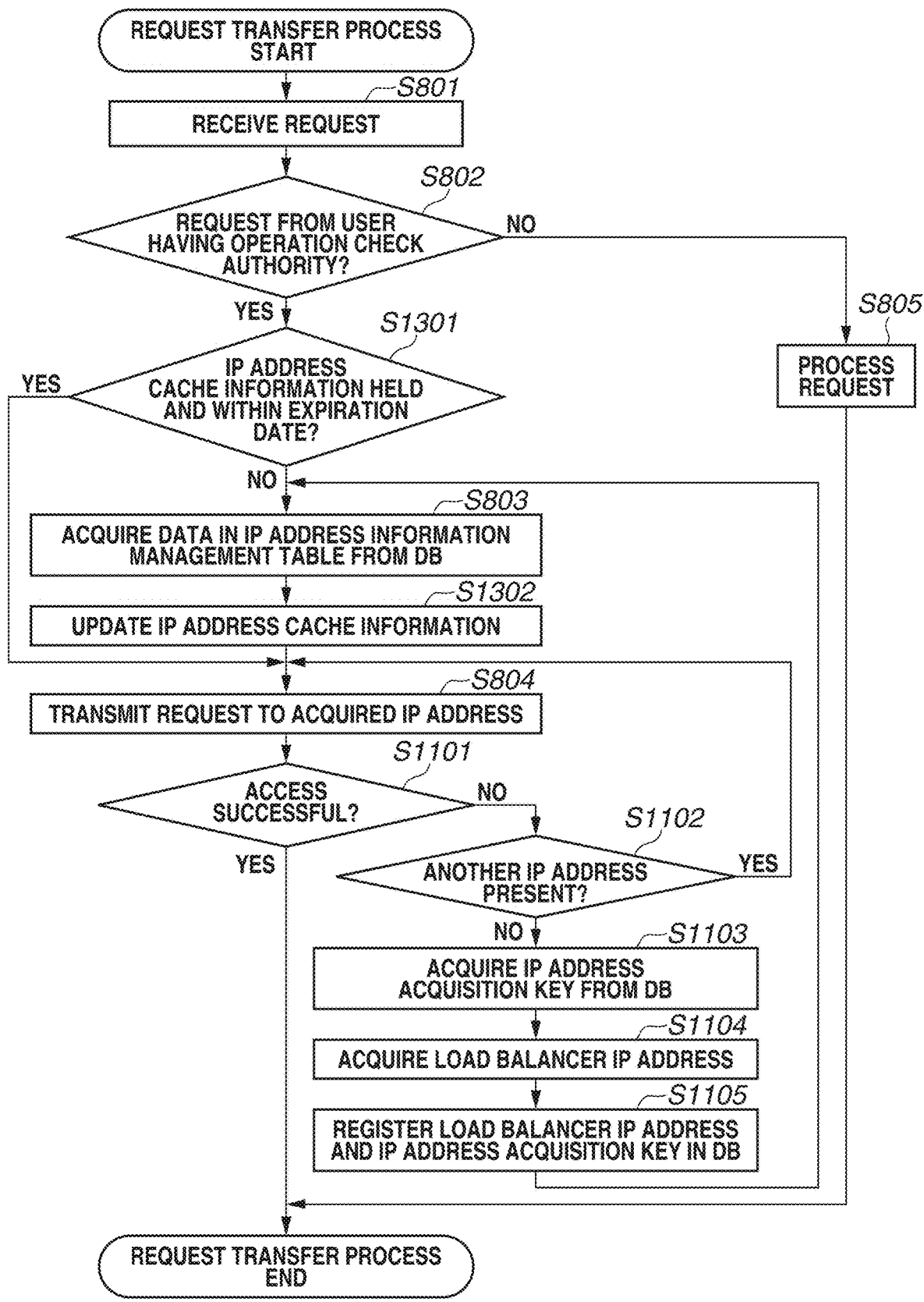
FIG. 13 is a flowchart illustrating an example of the request transfer process.

FIG. 13 is a flowchart illustrating an example of the request transfer process by the application server 109. Compared with FIG. 11, the difference is that steps S1301 to S1302 are added. With regard to the same processes as those in FIG. 11, the same reference numerals are used and the description thereof will be omitted.

In step S1301, it is determined whether the IP address information management unit 403 holds the IP address cache information and whether the expiration date is not passed. If the IP address cache information is held and the expiration date is not passed (YES in step S1301), the processing proceeds to step S804. If the determination condition is not satisfied (NO in step S1301), the processing proceeds to step S803.

In step S1302, an expiration date is added to the IP address in the IP address information management table acquired by the IP address information management unit 403 in step S803, and the IP address cache information is updated.

According to the third exemplary embodiment, the application server 109 caches the IP address information, and thereby can reduce the access to the IP address information management table.

A fourth exemplary embodiment will be described. In the second exemplary embodiment, if the IP address of the load balancer 111 in the Green environment 110 is changed and the access fails, the application server 109 re-acquires the IP address. On the other hand, in the fourth exemplary embodiment, the application server 109 periodically acquires the IP address using the IP address acquisition key at an arbitrary timing and registers the acquired IP address in the DB 103. The configurations illustrated in FIGS. 1 to 4, 6, 9, 10, 12, and 13 are common to both the third and fourth exemplary embodiments. Thus, in the fourth exemplary embodiment, the same parts as those in the third exemplary embodiment will be denoted by the same reference numerals and the description thereof will be omitted. The differences from the third exemplary embodiment will be mainly explained below.

Figure 14:
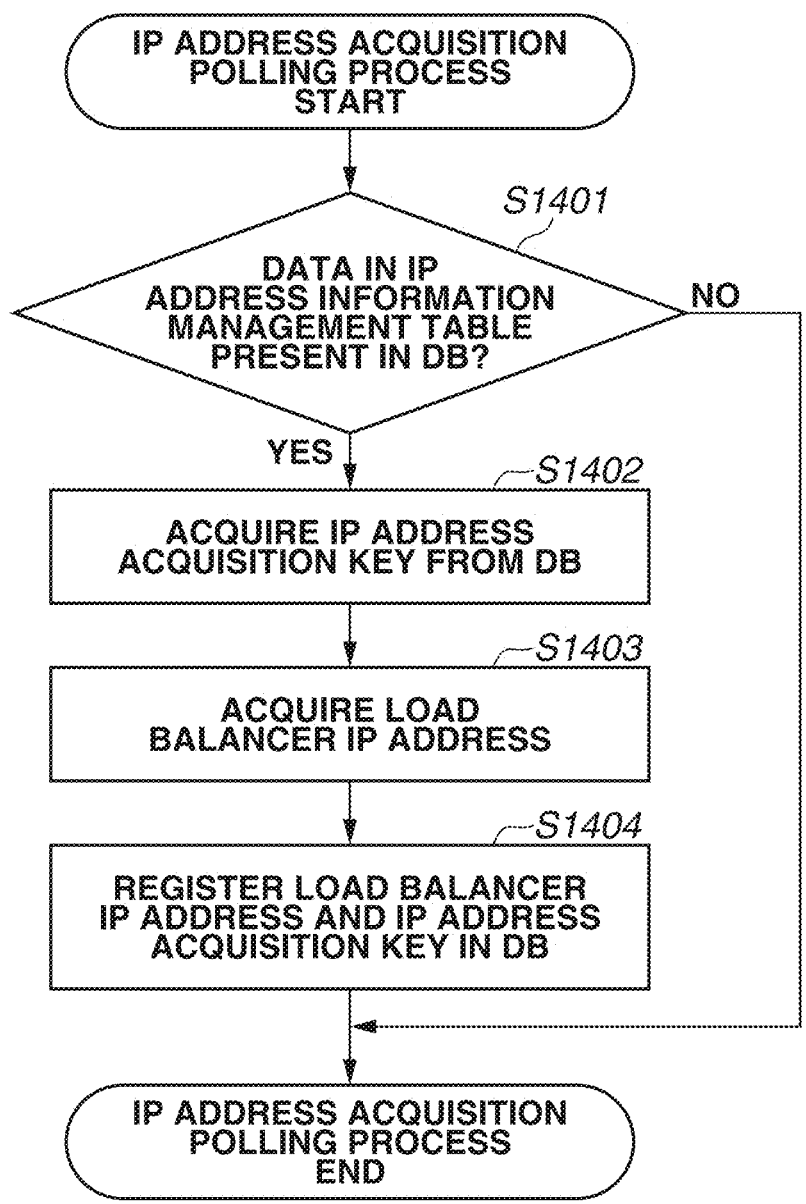
FIG. 14 is a flowchart illustrating an example of an IP address acquisition polling process.

FIG. 14 is a flowchart illustrating an example of an IP address acquisition polling process by the application server 109. The process described in this flowchart is executed according to a predetermined schedule set by the system administrator.

In step S1401, the IP address information management unit 403 determines whether data in the IP address information management table is present in the DB 103. As a result of the determination, if the data is present (YES in step S1401), the processing proceeds to step S1402. If the data is not present (NO in step S1401), the IP address acquisition polling process ends.

In step S1402, the IP address information management unit 403 acquires the IP address acquisition key in the IP address information management table managed on the DB 103.

In step S1403, the IP address of the load balancer 111 is acquired using the IP address acquisition key acquired in step S1402.

In step S1404, the IP address acquisition key acquired in step S1402 and the IP address acquired in step S1403 are registered in the DB 103 as the IP address information management table.

The process of this flowchart has been described as being executed by the application server 109, but may be executed by the management server 101.

As described above, according to the fourth exemplary embodiment, the time when the IP address of the IP address management table and the IP address of the load balancer 111 differ is shortened as much as possible by the polling process, and it is thereby possible to reduce the frequency of a load balancer IP address re-acquisition process.

In a fifth exemplary embodiment, the application server 109 registers the IP address of the load balancer 111 in the Green environment 110 in association with information of an acquisition date and time of the IP address. The configurations illustrated in FIGS. 1 to 4, 6, and 12 are common to both the fourth and fifth exemplary embodiments. Thus, in the fifth exemplary embodiment, the same parts as those in the fourth exemplary embodiment will be denoted by the same reference numerals and the description thereof will be omitted. The differences from the fourth exemplary embodiment will be mainly explained below.

FIG. 15 illustrates an example of the IP address information management table registered in the DB 103 by the IP address registration unit 305. The difference from FIG. 9 is that the date and time when the IP address of the load balancer 111 is acquired is also included.

Figure 16:
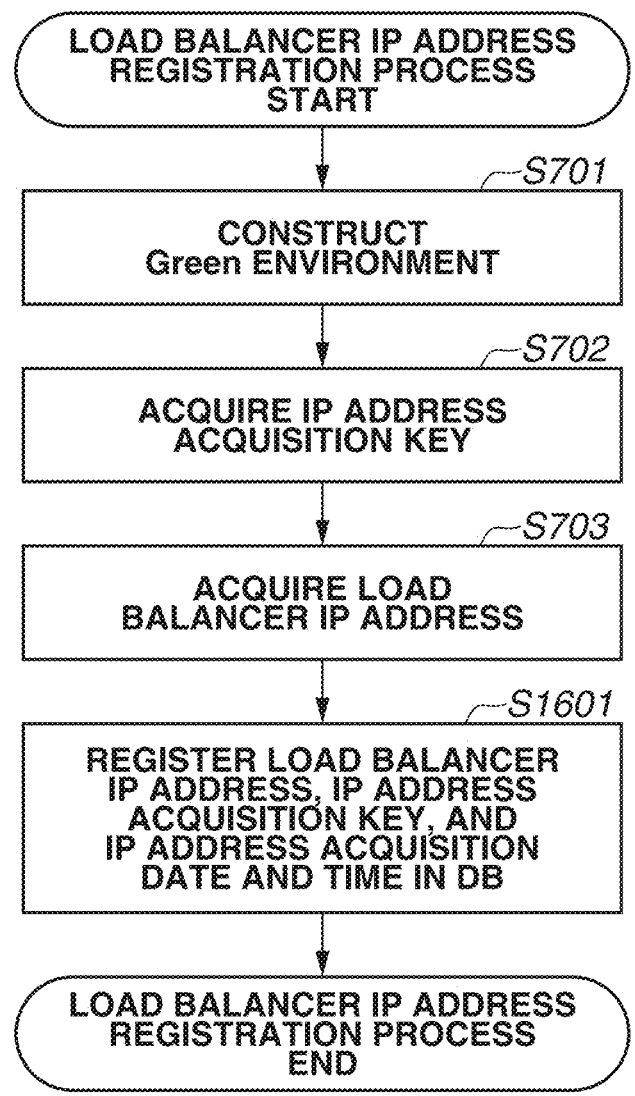
FIG. 16 is a flowchart illustrating an example of the load balancer IP address registration process.

FIG. 16 is a flowchart illustrating an example of the load balancer IP address registration process by the management server 101. Compared with FIG. 10, the difference is that step S1001 is replaced by step S1601. With regard to the same processes as those in FIG. 10, the same reference numerals are used and the description thereof will be omitted.

In step S1601, the IP address registration unit 305 adds an IP address acquisition date and time to the IP address acquisition key and the IP address acquired in steps S702 and S703, and registers the IP address acquisition key, the IP address, and the IP address acquisition date and time in the DB 103 as the IP address information management table.

Figure 17:
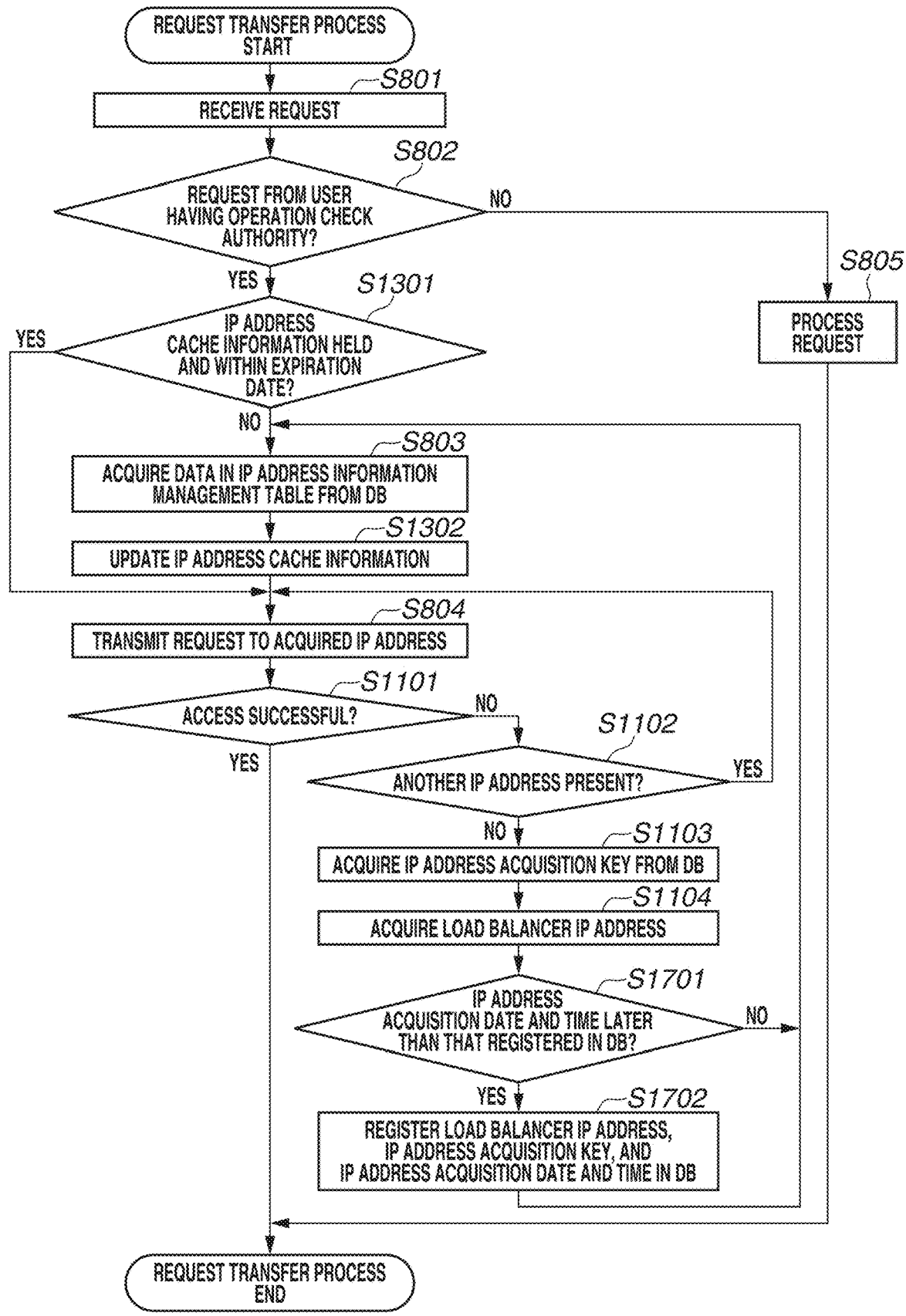
FIG. 17 is a flowchart illustrating an example of the request transfer process.

FIG. 17 is a flowchart illustrating an example of the request transfer process by the application server 109. Compared with FIG. 13, the difference is that step S1701 is added and step S1105 is replaced by step S1702. With regard to the same processes as those in FIG. 13, the same reference numerals are used and the description thereof will be omitted.

In step S1701, the IP address information management unit 403 determines whether the IP address acquisition date and time in the IP address management information table to be registered now is later than the IP address acquisition date and time in the IP address management information table already registered in the DB 103. As a result of the determination, if the IP address acquisition date and time of the IP address management information table to be registered now is later (YES in step S1701), the processing proceeds to step S1702. If the IP address acquisition date and time of the IP address management information table to be registered now is not later (NO in step S1701), the processing proceeds to step S803.

In step S1702, the IP address information management unit 403 adds the IP address acquisition date and time to the IP address acquisition key and the IP address acquired in steps S1103 and S1104, and registers the IP address acquisition key, the IP address, and the IP address acquisition date and time in the DB 103 as the IP address information management table.

FIG. 18 is a flowchart illustrating an example of the IP address acquisition polling process by the application server 109. Compared with FIG. 14, the difference is that step S1801 is added and step S1404 is replaced by step S1802. With regard to the same processes as those in FIG. 14, the same reference numerals are used and the description thereof will be omitted.

In step S1801, the IP address registration unit 305 determines whether to register the IP address, based on the IP address acquisition date and time in the IP address management information table already registered in the DB 103. The IP address registration unit 305 determines whether the IP address acquisition date and time of the IP address management information table to be registered now is later than the IP address acquisition date and time in the IP address management information table already registered in DB 103. As a result of the determination, if the IP address acquisition date and time of the IP address management information table to be registered now is later (YES in step S1801), the processing proceeds to step S1802. If the IP address acquisition date and time of the IP address management information table to be registered now is not later (NO in step S1801), the IP address acquisition polling process ends.

In step S1802, the IP address registration unit 305 adds the IP address acquisition date and time to the IP address acquisition key and the IP address acquired in steps S1402 and S1403, and registers the IP address acquisition key, the IP address, and the IP address acquisition date and time in the DB 103 as the IP address information management table.

According to the fifth exemplary embodiment described above, it is possible to prevent old load balancer IP address information from being registered in the DB 103, and therefore the frequency of access failure can be reduced and the Green environment 110 can be accessed without reducing the work efficiency of the operation checker.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-158664, filed Aug. 30, 2019, which is hereby incorporated by reference herein in its entirety.

What is claimed is:

1. A system comprising:
a first processing system in which a current version of an application operates, wherein the first processing system includes a first load balancing device and a plurality of first processing units, the plurality of the first processing units process at least a request received via the first load balancing device;
a second processing system in which a next version of the application operates wherein the second processing system includes a second load balancing device and a plurality of second processing units, the plurality of the second processing units process at least a request received via the second load balancing device;
a management server; and
a database,
wherein the management server comprises one or more first memories, and one or more first processors that execute a set of first instructions to register an internet protocol address of the second load balancing device in the database, and
wherein any one of the plurality of the first processing units included in the first processing system comprises one or more second memories, and one or more second processors that execute a set of second instructions to receive a request from an external apparatus via the first load balancing device included in the first processing system and to transmit, if the received request is a request to be processed in the second processing system, the received request to the second load balancing device included in the second processing system by using the internet protocol address registered in the database, and wherein the request transmitted to the second load balancing device is processed in any one of the plurality of the second processing units included in the second processing system.

2. The system according to claim 1, wherein the request from the external apparatus is transmitted to the first load balancing device included in the first processing system according to a record related to the first load balancing device included in the first processing system, the record being managed by a Domain Name System server different from the database of the system.

3. The system according to claim 1,
wherein the one or more first processors further execute the set of first instructions to register an internet protocol address of the second load balancing device included in the second processing system and key information for acquiring the internet protocol address of the second load balancing device included in the second processing system in the database as the information for accessing the second processing system,
wherein the one or more second processors further execute the set of second instructions to acquire an internet protocol address by using the key information registered in the database, and
wherein the one or more second processors further execute the set of second instructions to acquire an internet protocol address by using the key information registered in the database, register the acquired internet protocol address in the database, and transmit the received request to the second processing system by using the acquired internet protocol address if the received request fails to be transmitted to the second processing system by using information of the internet protocol address registered in the database.

4. The system according to claim 3,
wherein the one or more second processors further execute the set of second instructions to hold the internet protocol address of the second load balancing device included in the second processing system along with an expiration date as the information for accessing the second processing system,
wherein the one or more second processors further execute the set of second instructions to transmit the received request to the second processing system by using the held internet protocol address if the held internet protocol address has not passed the expiration date, and
wherein the one or more second processors further execute the set of second instructions to acquire an internet protocol address registered in the database, hold the acquired internet protocol address, and transmit the received request to the second processing system by using the acquired and held internet protocol address if the held internet protocol address has passed the expiration date.

5. The system according to claim 3, wherein the one or more second processors further execute the set of second instructions to acquire an internet protocol address by using the key information registered in the database according to a predetermined schedule, and register the acquired internet protocol address in the database.

6. The system according to claim 3,
wherein the one or more second processors further execute the set of second instructions to acquire an internet protocol address by using the key information registered in the database, and register the acquired internet protocol address in the database in association with acquisition date and time information, and
wherein the one or more second processors further execute the set of second instructions to determine whether to register the acquired internet protocol address in the database based on acquisition date and time information associated with the internet protocol address registered in the database.

7. The system according to claim 1,
wherein the request to be processed in the second processing system is a request for checking an operation of the second processing system,
wherein the one or more second processors further execute the set of second instructions to determine whether the received request is the request to be processed in the second processing system, and
wherein the received request is determined to be the request to be processed in the second processing system if the received request includes a predetermined identifier.

8. A control method for a system including a first processing system in which a current version of an application operates, a second processing system in which a next version of the application operates, and a management server, wherein the first processing system includes a first load balancing device and a plurality of first processing units, and the second processing system includes a second load balancing device and a plurality of second processing unit, the control method comprising:
registering, by the management server, an internet protocol address of the second load balancing device in the database;
receiving, by any one of the plurality of processing units included in the first processing system, a request to be processed in the second processing system from an external apparatus via the first load balancing device included in the first processing system; and
transmitting, if the received request is a request to be processed in the second processing system, by the first processing system, the received request to the second load balancing device included in the second processing system.

* * * * *